United States Patent

Wexler et al.

Patent Number: 5,445,471
Date of Patent: Aug. 29, 1995

[54] PLASTIC JOINT FOR ARTICULATING TWO COMPONENTS

[75] Inventors: Eugen Wexler; Thomas Stopp, both of Lauf, Germany

[73] Assignee: EuWe Eugen Wexler GmbH, Lauf, Germany

[21] Appl. No.: 90,414

[22] Filed: Jul. 12, 1993

[30] Foreign Application Priority Data

Jul. 25, 1992 [DE] Germany ............... 42 24 699.7

[51] Int. Cl.[6] ............................................. F16B 1/00
[52] U.S. Cl. .................................. 403/220; 403/291;
403/72; 16/225; 16/280; 16/DIG. 3; 464/87; 464/147
[58] Field of Search ............... 403/223, 220, 229, 291, 403/166, 57, 72, 51; 16/225, 280, DIG. 13; 464/78, 87, 106, 147; 446/107, 374, 368

[56] References Cited

U.S. PATENT DOCUMENTS

| | | |
|---|---|---|
| 2,607,411 | 8/1952 | Van Vliet . |
| 2,845,748 | 8/1958 | Derham ............... 16/225 |
| 3,019,552 | 2/1962 | Schleich ............... 446/374 |
| 3,393,535 | 7/1968 | Morin . |
| 3,405,539 | 10/1968 | Tanaka . |
| 3,918,196 | 11/1975 | Schleich ............... 446/107 |
| 4,115,902 | 9/1978 | Taylor ............... 16/DIG. 13 |
| 4,603,904 | 8/1986 | Tolleson et al. ............... 403/291 |

FOREIGN PATENT DOCUMENTS

| | | | |
|---|---|---|---|
| 2517078 | 1/1976 | Germany ............... | 16/DIG. 13 |
| 3334314 | 4/1986 | Germany . | |
| 648385 | 3/1985 | Switzerland . | |

OTHER PUBLICATIONS

"Kunststoff-Teile mit Vielfact-Funktionen," Dr. Von Prof, Kunststoffe 66 (1976, pp. 265–271.

Primary Examiner—Edward K. Look
Assistant Examiner—James A. Larson
Attorney, Agent, or Firm—Laff, Whitesel, Conte & Saret, Ltd.

[57] ABSTRACT

A plastic joint for articulating two components comprises two dimensionally stable fastening elements serving for connecting the plastic joint with the corresponding component and a joint element arranged between the fastening elements defining at least one joint axis for deflecting the joint out of its straight position. The joint element is formed as a flexible moulded part which is injected directly with its ends to the fastening elements.

6 Claims, 1 Drawing Sheet

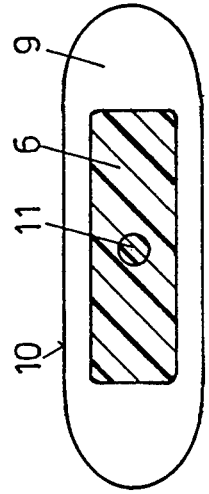
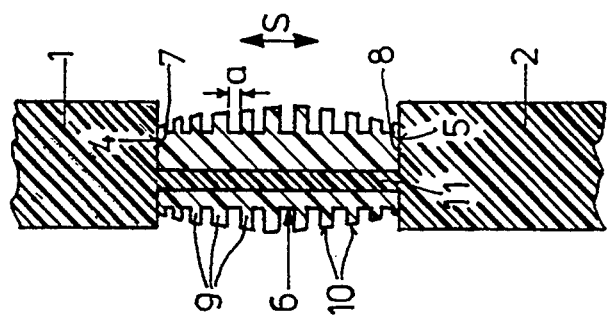
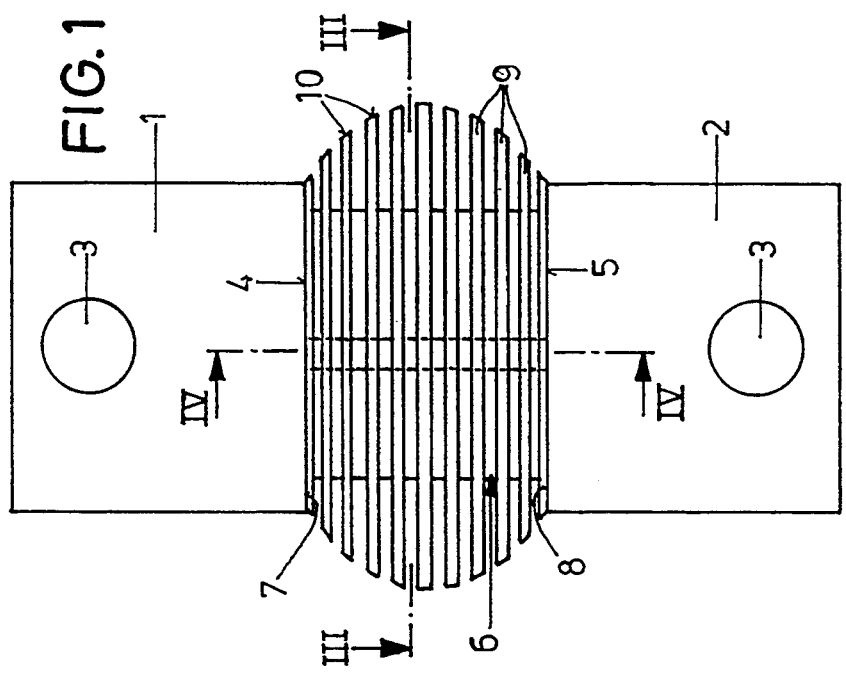
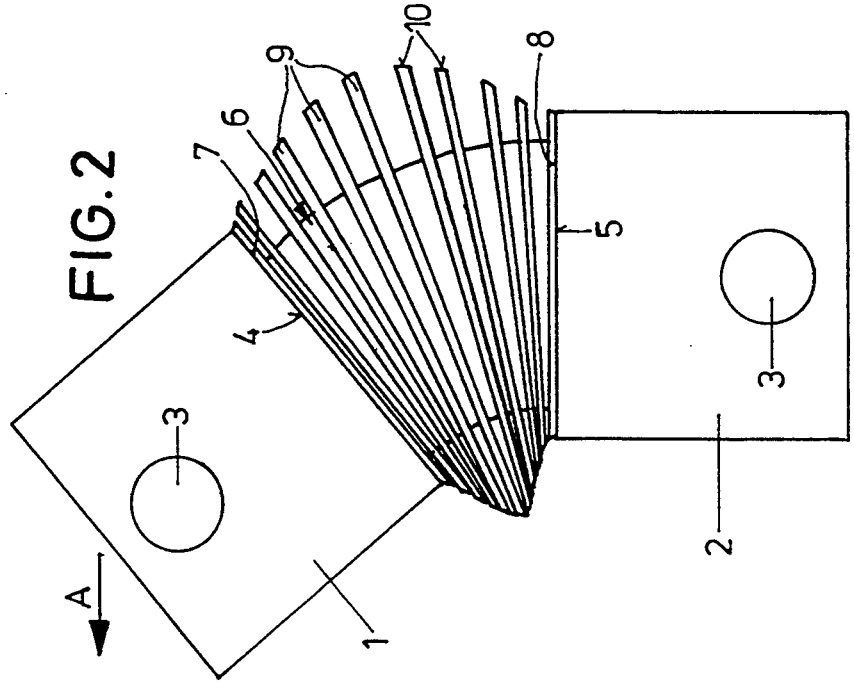

PLASTIC JOINT FOR ARTICULATING TWO COMPONENTS

FIELD OF THE INVENTION

The invention relates to a plastic joint for articulating two components with two dimensionally or inherently stable fastening elements serving for connecting the plastic joint with the corresponding component and a joint element arranged between the fastening elements, which joint element defines at least one joint axis for deflecting the joint out of its straight position.

BACKGROUND OF THE INVENTION

Joints are known in many different constructive embodiments. Apart from the classic types of joints, such as e.g. ball-and-socket joints or hinges, for example film hinges pertain to the typical representatives of plastic joints. Such film hinges comprise dimensionally or inherently stable fastening elements serving for connecting the plastic joint with a corresponding component, which fastening elements are formed if necessary in one piece with the corresponding component. Between these fastening elements a joint element is arranged, which defines a joint axis for deflecting the joint out of its straight position. In case of a film hinge the joint axis is defined by a reduction in cross-section of the joint element arranged between the two fastening elements. Due to their sensitivity with regard to fracture the employment of film hinges is limited.

SUMMARY OF THE INVENTION

It is an object of the invention to create a plastic joint designed in a constructive simple manner, which can be universally employed.

This object is achieved by the joint element being formed as a moulded part which is directly injected with its ends to the fastening elements, which moulded part is made of a more flexible plastics material than that of the fastening elements. By the corresponding embodiment of the joint element the plastic joint is to be manufactured in one operation from a plastics material which can be injection-moulded, i.e. no further assembly steps are required. Based on the flexible design of the joint element no given joint axis is determined, as it is the case for example with hinge joints. On the contrary the plastic joint according to the invention can be deflected out of its straight position into practically any desired spatial direction. The cited flexibility of the joint element furthermore delivers the advantage that the plastic joint automatically returns to its external position when being disengaged.

Based on its ability to be universally employed, plastic joints according to the invention can be used for the most different purposes. So, the joint has been developed in particular for use in belt tighteners of vehicles. However, it can as well be used for example as a joint connection between the mast heel and the floating body of a surfboard.

Hard elastic thermoplast, in particular polypropylene, talcum-reinforced polypropylene, ABS or polyamide for the fastening elements and a thermoplastic rubber for the joint element have proved to be especially suitable materials.

According to a preferred embodiment of the invention the joint element is rotationally symmetrical in the straight position of the joint. It is, in particular cylindrical. Starting from its straight position the plastic joint is thus equally flexible into all spatial directions. Its joint element thus defines practically an infinite number of equivalent joint axes.

Even with another embodiment of the plastic joint, the joint element of which is formed cuboidal, the joint can be deflected practically into all spatial directions. By the cuboidal embodiment of the joint element, however, different flexibility properties with respect to the direction of deflection are created. Thus with a deflection about a joint axis extending parallel to the broad sides of the cuboidal joint element the plastic joint must be operated with a lower force than with a deflection about a joint axis extending parallel to the narrow sides of the joint element. The restoring forces are correspondingly higher with a deflection about a joint axis extending parallel to the narrow sides.

By the lamellas of another preferred embodiment of the invention the joint element is supported in particular with large deflections out of the straight position. By the mutual bearing of the portions, facing towards the direction of deflection, of the lamellas, when they have reached a certain deflection position, practically a kind of stop is created, which prevents or at least further impedes a further deflection of the joint element. Thus the joint element itself is protected against a destruction by an excessive material extension. A further effect of the lamellas lies in the fact that the restoring force inherent to the joint element is increased due to their mutual bearing.

By the reinforcement core provided according to another preferred embodiment of the invention the joint element is additionally stabilized. Furthermore joints with different deflection resistances or restoring forces, respectively, can be created by the mutual dimensioning of the joint element and its reinforcement core with unchanging values of elasticity of the used materials.

Further features, details and advantages of the invention will become apparent from the ensuing description of one example of embodiment taken in conjunction with the accompanying drawing.

BRIEF DESCRIPTION OF THE DRAWING

FIG. 1 is a side view of the plastic joint according to the invention in its straight position, FIG. 2 is a side view of the plastic joint according to the invention in is deflected position, FIG. 3 is a cross-section through the plastic joint according to line III—III according to FIG. 1 and FIG. 4 is a longitudinal section through the plastic joint corresponding to line IV—IV according to FIG. 1.

DESCRIPTION OF THE PREFERRED EMBODIMENTS

A plastic joint according to the invention substantially consists of two dimensionally stable fastening elements 1, 2 serving for connecting the plastic joint with any component, which fastening elements are formed as cuboidal plates in the shown example of embodiment. For said connection the two fastening elements 1, 2 can be provided for example with a boss 3. Practically any shaping of the fastening elements 1, 2 is possible, so the latter can be equipped on their ends facing away from each other for example with locking means for locking engagement with components.

Between the narrow sides 4, 5 facing each other of the two fastening elements 1, 2 a substantially cuboidal joint element 6 is provided, which is injection-moulded with its ends 7, 8, facing away from each other, directly to the narrow sides 4, 5 of the fastening elements 1, 2.

Furthermore the joint element 6 is provided with lamellas 9 integrally moulded to the latter and projecting beyond its rectangular cross-section (FIG. 3) transversely to the straight direction S, of which lamellas 9 the mutual distance a corresponds approximately to their thickness in this direction. In the plan view (FIG. 3) these lamellas 9 are formed elongated oval. With an increasing distance from the ends 7, 8 of the joint element 6 the lamellas 9 enlarge in their main surface in such manner that the envelope curve surrounding their outer edges 10 substantially appears as a partial circular line.

As becomes clear from FIGS. 3 and 4, the joint element 6 is stabilised by a reinforcement core 11, which is formed as a thin strand from the material of the fastening elements 1, 2 and which passes at their ends integrally into the latter.

A talcum-reinforced thermoplastic polypropylene is used as a material for the fastening elements 1, 2 and for the reinforcement core 11, which polypropylene has hard elastic properties. The joint element is made of a thermoplastic rubber, as it is available for example from the company Gummiwerk Kraiburg GmbH & Co, 8264 Waldkraiburg under the designation TC 9ATZ.

The plastic joint shown in the drawing is manufactured in one operation, without the necessity of opening the mould. For this purpose at first the thermoplastic plastics material for the fastening elements 1, 2 is injected into corresponding moulding cavities which are closed by slides. In the magnitude of about one second thereafter the plastics material for the joint element 6 is injected into the corresponding moulding cavity after the slides have been removed, whereupon the plastics material intimately connects with the narrow sides 4, 5 of the fastening elements 1, 2. Thus, practically, an integral embodiment of the plastic joint is given.

In practical use the plastic joint assumes the straight position shown in FIGS. 1 or 4, respectively, due to the shape restoring force inherent to the material of the joint element 6, if no deflection forces act upon the fastening elements 1, 2. If the one fastening element 1 is deflected in relation to the second fastening element 2 by the influence of a deflection force, as this is shown in FIG. 2, the joint element 6 deforms flexibly. When reaching a certain angle of deflection the portions, located on the side of the direction of deflection A, of the lamellas 9 are blocked, so that a further deflection is at least impeded and the restoring force inherent to the joint element 6 is increased.

What is claimed is:

1. A plastic joint for articulating two components comprising two inherently stable fastening elements (1, 2) made of a plastic material and serving for connecting the plastic joint with the corresponding component and a joint element (6) arranged between the fastening elements (1, 2), which joint element (6) defines at least one joint axis for deflecting the plastic joint between a straight position and a deflected position, wherein the joint element (6) is formed as a moulded part which is directly injection-moulded with its ends (7, 8) to the fastening elements (1, 2), which moulded part is made of a more flexible plastics material than that of the fastening elements (1, 2) and, wherein the joint element (6) is provided with a reinforcement core (11) connecting the fastening elements (1, 2), which reinforcement core (11) is formed in one piece with the fastening elements (1, 2) and which is made of the same material.

2. A plastic joint according to claim 1 wherein the fastening elements (1, 2) are made of a hard elastic thermoplastic.

3. A plastic joint according to claim 1, wherein the joint element (6) is made of a thermoplastic rubber.

4. A plastic joint according to claim 1 wherein the joint element (6) is rotationally symmetrical in the straight position of the plastic joint.

5. A plastic joint according to claim 1, wherein the joint element (6) is cuboidal.

6. A plastic joint according to claim 7 wherein the joint element (6) is provided with lamellas (9) projecting beyond its cross-section, which lamellas (9) are arranged with a distance (a) from each other in such a manner that they abut against each other when, the plastic joint is deflected out of its straight position.

* * * * *